United States Patent [19]

Kojima et al.

[11] Patent Number: 5,998,566
[45] Date of Patent: *Dec. 7, 1999

[54] PHENOL DERIVATIVES AND PROCESS FOR THEIR PRODUCTION

[75] Inventors: Takashi Kojima, Kurashiki; Takafumi Yoshimura, Tsukuba, both of Japan

[73] Assignee: Mitsubishi Gas Chemical Company, Inc., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/565,346

[22] Filed: Nov. 30, 1995

[30] Foreign Application Priority Data

Dec. 5, 1994 [JP] Japan ................................. 6-300948
Dec. 28, 1994 [JP] Japan ................................. 6-327531

[51] Int. Cl.⁶ ..................................................... C08G 61/02
[52] U.S. Cl. ........................... 528/212; 525/214; 525/217; 525/219
[58] Field of Search .................... 528/205, 212, 528/214, 217, 219

[56] References Cited

U.S. PATENT DOCUMENTS

3,678,006  7/1972  Bilow .......................................... 528/79
5,186,873  2/1993  Uemura et al. .......................... 264/29.5

FOREIGN PATENT DOCUMENTS

0196160  10/1986  European Pat. Off. .
62-227924  10/1986  Japan .
62-230842  10/1986  Japan .
61-293219  12/1986  Japan .
2088609  3/1990  Japan .
618835  3/1994  Japan .
6-93086  4/1994  Japan .
6-263839  9/1994  Japan .

OTHER PUBLICATIONS

Dainippon Ink, Database WPIDS, abstract No. 94–338338, abstracting JP 06263839, Sep. 1994.

Ota, Database WPIDS, abstract No. 93–237098, abstracting JP 05109522, Apr. 1993.

*Primary Examiner*—Jeffrey C. Mullis
*Attorney, Agent, or Firm*—Roylance, Abrams, Berdo & Goodman, L.L.P.

[57] ABSTRACT

The improved phenol derivatives having a phenolic structure as part of the molecular backbone are produced by reacting condensed polycyclic aromatic hydrocarbons, either individually or in combination with unsaturated cyclic aliphatic hydrocarbons, with phenols in the presence of Friedel-Crafts catalysts and have softening points of no more than 150° C., number average molecular weights of 250–800 and phenolic hydroxyl equivalents of 140–850 g/eq. These phenol derivatives are useful either as starting materials for the manufacture of heat-resistant thermosetting resins or as modifiers thereof. They can be produced by reacting the indicated components in the presence of Friedel-Crafts catalysts, typically a mixture of hydrogen fluoride and boron trifluoride, at temperature of 0–350° C.

11 Claims, No Drawings

PHENOL DERIVATIVES AND PROCESS FOR THEIR PRODUCTION

BACKGROUND OF THE INVENTION

1. Field of the Invention

This invention relates to phenol derivatives having a phenol structure as part of the molecular backbone which are suitable for use as raw materials for the manufacture of heat-resistant thermosetting resins. The invention also relates to a process for producing such phenol derivatives.

2. Prior Art

Phenolic resins, urea resins and epoxy resins are well known thermosetting resins and because of their high heat resistance, good mechanical and electrical characteristics as well as good bonding properties, they are extensively used in various applications including adhesives, paints, semiconductor sealants, molding materials and binders. As the scope of their application is growing today, those thermosetting resins are required to satisfy more rigorous requirements for performance characteristics, particularly in terms of heat resistance, as well as water resistance and tenacity.

The heat resistance of most organic polymer materials is dependent on their molecular structure and it is generally held that the presence of aromatic and heterocyclic structures in their molecular backbone is advantageous for enhanced heat resistance. For example, Japanese Patent Publication (kokoku) No. Hei 6-18835 proposes the use of naphthalene compounds having a vinyl benzyl ether group to improve the heat resistance of polyimide resins. Japanese Patent Public Disclosure (kokai) No. Hei 6-93086 teaches that cured products of lesser weight loss by heating can be obtained by curing naphthalene and p-xylylene glycol in the presence of an acid catalyst.

These approaches share the common feature of being an attempt to provide enhanced heat resistance by introducing a comparatively large aromatic ring compound into the molecular backbone. However, no technologies have yet been established that can prepare the starting materials (naphthalene compounds and p-xylylene glycol) in an industrially advantageous manner and it is critical to establish economical methods of synthesis or develop alternatives for those compounds.

A problem that has recently been addressed in the use of semiconductor resins typified by ortho-cresol novolak epoxy resins is that they are so hygroscopic as to crack when dipped in a solder bath. To solve this problem, improvements in heat and water resistance are needed. Japanese Patent Public Disclosure (kokai) No. Sho 61-293219 proposed the epoxidization of phenolic resins modified with dicyclopentadiene, and Japanese Patent Public Disclosure (kokai) No. Hei 6-263839 proposed the epoxidization of dicyclopentadiene-modified naphtholic resins. However, neither products of epoxidization are satisfactory in terms of heat and water resistance and further improvements in these characteristics are desired.

Conventional thermosetting resins have the disadvantage of being "hard and brittle" on account of their molecular structure. With a view to eliminating this difficulty, attempts are being made to incorporate an aliphatic ring structure or to have a two-dimensional crosslinked structure introduced as part of the molecular backbone. However, it is difficult in the state of the art to introduce these structures and yet insure the desired heat resistance.

The present invention has been accomplished under these circumstances of the prior art of thermosetting resins and has as an object providing a starting material for the manufacture of thermosetting resins with improved heat resistance that have a reactive phenolic structure and a heat-resisting condensed polycyclic aromatic structure, as well as a process for producing said starting material in an industrially advantageous manner.

Another object of the invention is to provide a starting material for the manufacture of thermosetting resins having resistance to heat and water, as well as tenacity, or a modifier for imparting these desirable characteristics, and a process for producing said starting material or modifier in an industrially advantageous manner.

The present inventors made various studies on the reaction for copolymerizing condensed polycyclic aromatic hydrocarbons and phenols and found that in the presence of Friedel-Crafts catalysts, condensed polycyclic aromatic hydrocarbons easily reacted with phenols to provide copolymerization products having a phenolic structure and that by controlling the properties of those polymerization products, one could produce phenol derivatives in an industrially advantageous manner that had a phenolic structure as part of the molecular backbone and that were provided with suitable properties for use as starting materials for the manufacture of heat-resistant thermosetting resins. The present invention has been accomplished on the basis of these findings. The present inventors also found that when phenols were reacted with both condensed polycyclic aromatic hydrocarbons and unsaturated cyclic aliphatic hydrocarbons, one could produce phenol derivatives having suitable properties for use as either starting materials or modifiers that would provide thermosetting resins improved in terms of not only heat resistance but also water resistance and tenacity.

SUMMARY OF THE INVENTION

In its broadest aspect, the present invention relates to phenol derivatives having a phenolic structure as part of the molecular backbone that are produced by reacting phenols with condensed polycyclic aromatic hydrocarbons, either alone or in combination with unsaturated cyclic aliphatic hydrocarbons, in the presence of Friedel-Crafts catalysts and that have softening points of no more than 150° C., number average molecular weights of 250–800 and phenolic hydroxyl equivalents of 140–850 g/eq. These phenol derivatives can be produced by reacting phenols with condensed polycyclic aromatic hydrocarbons, either alone or in combination with unsaturated cyclic aliphatic hydrocarbons, in the presence of Friedel-Crafts catalysts at temperatures of 0–200° C.

In another aspect, the present invention relates to phenol derivatives having a phenolic structure as part of the molecular backbone that are produced by reacting phenols with condensed polycyclic aromatic hydrocarbons in the presence of Friedel-Crafts catalysts and that have softening points of no more than 130° C., number average molecular weights of 300–600 and phenolic hydroxyl equivalents of 140–850 g/eq. These phenol derivatives can be produced by reacting phenols with condensed polycyclic aromatic hydrocarbons in the presence of Friedel-Crafts catalysts, typically hydrogen fluoride and boron trifluoride, at temperatures of 50–200° C.

In yet another aspect, the present invention relates to phenol derivatives having a phenolic structure as part of the molecular backbone that are produced by reacting phenols with both condensed polycyclic aromatic hydrocarbons and unsaturated cyclic aliphatic hydrocarbons in the presence of Friedel-Crafts catalysts and that have softening points of no more than 150° C., number average molecular weights of 250–800 and phenolic hydroxyl equivalents of 140–850 g/eq. These phenol derivatives can be produced by reacting phenols with both condensed polycyclic aromatic hydrocarbons and unsaturated cyclic aliphatic hydrocarbons in the presence of Friedel-Crafts catalysts, typically hydrogen fluoride and boron trifluoride, at temperatures of 0–200° C.

DETAILED DESCRIPTION ON THE INVENTION

The phenol derivatives of the invention have softening points of no more than 150° C. and number average molecular weights of 250–800. If they have softening points in excess of 150° C. and/or number average molecular weights higher than 800, low-temperature fluidity is not attained and difficulty is encountered in handling the derivatives and, in addition, insoluble matter will result from the reaction in solvents. If the number average molecular weight of the phenol derivatives is lower than 250, the degree of their polymerization is too small to manufacture resins of good heat resistance. If condensed polycyclic aromatic hydrocarbons are independently reacted with phenols, it is particularly preferred for the resulting phenol derivatives to have softening points of no more than 130° C. and number average molecular weights of 300–600.

The phenol derivatives of the invention have phenolic hydroxyl equivalents of 140–850 g/eq, preferably 140–340 g/eq. If their phenolic hydroxyl equivalent is greater than 850 g/eq, the density of active points for the curing reaction per molecule is too low to achieve a sufficient crosslink density during the curing step, so that its efficiency decreases and there can be achieved no improvement in heat resistance. On the other hand, it is practically impossible for the process of the invention to yield products having phenolic hydroxyl equivalents smaller than 140 g/eq.

The number average molecular weight of the phenol derivatives of the invention can be metered with a vapor pressure osmometer using chloroform or pyridine as a solvent and their softening point is measured with a capillary rheometer of a constant load extrusion type. To determine the phenolic hydroxyl equivalent of the phenol derivatives, acetylation is first performed with acetic anhydride by the usual manner and then back titration is made.

Like novolak phenolic resins, the phenol derivatives of the invention which have a phenolic structure as part of the molecular backbone are capable of entering into a curing reaction with hexamine or epoxides to form methylene or epoxy crosslinks. In addition, glycidyl groups can be easily introduced by reaction with epichlorohydrin in the usual manner and this reaction can in turn be utilized to prepare phenolic and epoxy resins.

It is difficult to identify the definite molecular structures of the compounds of the invention; however, in view of the above-described reactivity of the compounds and on the basis of the explanation given in J. Org. Chem., 30, 3176 (1965) about the reaction mechanism of naphthalene polymerization using Friedel-Crafts catalysts, it can at least be said that the compounds of the invention have both a condensed polycyclic aromatic structure contributing higher heat resistance and a phenolic structure contributing better efficiency in the curing reaction and that said compounds have two or more active sites for the curing reaction in one molecule.

Therefore, by blending the compounds of the invention with thermosetting resins and co-curing the blend or by using them as part or all of the starting monomers for the preparation of thermosetting resins or prepolymers thereof, one can manufacture thermosetting resins having improved heat resistance, optionally together with better water resistance and tenacity, or prepolymers thereof. If necessary, curing agents, curing accelerators and fillers may be added to the prepolymers so that they can be used in various applications.

The compounds of the invention have such lower concentrations of hydroxyl groups than phenol that they are also expected to have better chemical resistance and electrical characteristics.

The process for producing the phenol derivatives of the invention which have phenolic hydroxyl groups will now be described.

Examples of the condensed polycyclic aromatic hydrocarbon compounds to be used as a starting material in the process include naphthalene, methylnaphthalene, anthracene, phenanthrene, pyrene, and substances that contain these compounds. The condensed polycyclic aromatic hydrocarbon compounds may be used either alone or in admixtures. Among the compounds listed above, naphthalene is particularly preferred since it is industrially available at low cost.

Examples of the unsaturated cyclic aliphatic hydrocarbon compounds which may be used in combination with the condensed polycyclic aromatic hydrocarbon compounds include cyclopentadiene, dicyclopentadiene and 4-vinylcyclohexene, among which cyclopentadiene and dicyclopentadiene may advantageously be used to provide improved water resistance and tenacity. Dicyclopentadiene is particularly preferred since it is industrially available at low cost.

Examples of the phenols include aromatic compounds containing at least one phenolic hydroxyl group, such as phenol, cresol, xylenol, catechol and isomers thereof, as well as α- or β-naphthol, and substances containing these aromatic compounds. Among the compounds listed above, phenol is particularly preferred since it is industrially available at low cost.

The proportions of the condensed polycyclic aromatic compounds to be copolymerized with the phenols should appropriately be selected in accordance with the properties required of the copolymerization product such as the desired molecular weight, phenolic hydroxyl group content and softening point; generally, the phenols are used in amount of 10–5,000 parts, preferably 50–2,000 parts, per 100 parts of the condensed polycyclic aromatic hydrocarbons. If the condensed polycyclic aromatic hydrocarbons are to be used in combination with the unsaturated cyclic aliphatic hydrocarbons, the latter are generally used in 0.01–1.0 mole, preferably 0.02–0.5 moles, and the phenols are generally used in 0.1–50 moles, preferably 2–20 moles, per mole of the condensed polycyclic aromatic hydrocarbons.

If the phenols are fed in proportions less than 10 parts per 100 parts of the condensed polycyclic aromatic hydrocarbons or less than 0.1 mole per mole of the condensed polycyclic aromatic hydrocarbons, the major products will be the polycondensation product of the condensed polycyclic aromatic hydrocarbons, the polycondensation product of the unsaturated cyclic aliphatic hydrocarbons, and the polycondensation product of both the condensed polycyclic aromatic hydrocarbons and the unsaturated cyclic aliphatic hydrocarbons, and the content of the phenolic hydroxyl groups is so low that the efficiency of the curing step will drop significantly. As the phenols are fed in increasing proportions, the content of the phenolic hydroxyl groups in the reaction product will increase; however, even if more than 10 moles of the phenols are used per mole of the condensed polycyclic aromatic hydrocarbons, or more than 5,000 parts of the phenols are used per 100 parts of the condensed polycyclic aromatic hydrocarbons, there will be no substantial increase in the content of the phenolic hydroxyl groups and an economic disadvantage will result due to the increased cost for recovering the unreacted phenols.

If the unsaturated cyclic aliphatic hydrocarbons are fed in proportions lower than 0.01 mole per mole of the condensed polycyclic aromatic hydrocarbons, there is no substantial advantage of adding them; if they are used in more than 1.0 mole, the purpose of providing better heat resistance is not attained.

In order to insure the desired content of the phenolic hydroxyl groups, the phenols must be fed in amounts exceeding the theoretical value. It should particularly be mentioned that in order to insure phenolic hydroxyl equivalents not more than 240 g/eq, the phenols have to be used in at least 5 moles per mole of the condensed polycyclic aromatic hydrocarbons.

Reaction may be performed by simultaneous feeding of the reactor with the phenols and the condensed polycyclic aromatic hydrocarbons either alone or in combination with the unsaturated cyclic aliphatic hydrocarbons. Alternatively, either one of these components may first be fed, then the remaining component or components are subsequently added. In this case of consecutive charging, it is preferred to feed at least the catalyst component and the phenols before the addition of the remaining component or components.

The copolymerization reaction to be performed in the invention employs Friedel-Crafts catalysts including aluminum chloride ($AlCl_3$), hydrogen fluoride (HF), boron trifluoride ($BF_3$) and a mixture of hydrogen fluoride and boron trifluoride ($HF.BF_3$). The mixture of HF and $BF_3$ is particularly preferred because it has high activity while permitting easy recovery and removal of the catalyst components.

The Friedel-Crafts catalysts are to be used in amounts ranging from 0.02 to 10 moles per mole of the starting condensed polycyclic aromatic hydrocarbons. If the catalyst is a mixture of HF and $BF_3$, HF and $BF_3$ are preferably used in respective amounts of 0.1–10 moles and 0.05–5.0 moles per mole of the starting condensed polycyclic aromatic hydrocarbons.

The temperature for the copolymerization reaction varies with the species of the catalyst to be used, the amount of its use and the softening point of the desired phenol derivative; generally, it is within the range of 0–350° C. In the particular case of using the $HF.BF_3$ catalyst system, the copolymerization temperature is generally in the range of 0–200° C., preferably 0–180° C. If the reaction temperature is unduly low, the intended copolymerization will not proceed and the major product will be dimers of the condensed polycyclic aromatic hydrocarbons, having undesirably low concentrations of the phenolic hydroxyl groups. If, on the other hand, the reaction temperature is unduly high, the degree of polymerization of the product is so high that difficult is involved in controlling the softening point of the product to lie within an appropriate range. If the reactants are the condensed polycyclic aromatic hydrocarbons and the phenols, the reaction temperature is generally in the range from 50–350° C. and if the $HF.BF_3$ catalyst system is used, the reaction temperature is preferably in the range of 50–200° C., more preferably 80–180° C.

The copolymerization reaction is completed typically within 5–300 min, preferably 30–240 min. The reaction pressure is not limited to any particular values and the reaction is usually performed at pressures that maintain the reaction mixture in a liquid phase.

When implementing the process for producing the phenol derivatives of the invention, the reaction may be performed in any solvents that will not interfere with the reaction.

After the end of the copolymerization reaction, the catalyst, the unreacted starting materials and the low-boiling point components are removed in the usual manner to give the phenol derivative of the invention. If the catalyst used is a Lewis acid such as $AlCl_3$, the low-boiling point components and the unreacted components are first removed by a suitable method such as stripping with an inert gas and, thereafter, the catalyst component is removed by washing with water and filtration. If the catalyst is a $HF.BF_3$ system, the greater part of the catalyst components can be recovered by reducing the pressure and the efficiency of the recovery can be enhanced by stripping with an inert gas or elevating the temperature in the reaction system. After the catalyst recovery, stripping with an inert gas or any other suitable techniques may be employed to remove the unreacted starting materials and low-boiling point components from the product.

If the phenols are to be fed to the production process of the invention in comparatively large proportions, it is preferably combined with a recovery process for the unreacted phenols.

As described in J. Org. Chem. 30, 3176 (1965), supra, the Friedel-Crafts catalysts are known to exhibit activity in the addition and coupling polymerizations of condensed polycyclic aromatic hydrocarbons. On the other hand, mononuclear phenols such as phenol and cresol which are industrially particularly advantageous starting materials among the phenols to be used in the process of the invention are so low in reactivity that no polymerization products will result from such mononuclear phenols alone even if Friedel-Crafts catalysts are employed. According to the invention, such phenols are instead reacted with the condensed polycyclic aromatic hydrocarbons to provide novel starting materials for use in the manufacture of heat-resistant thermosetting resins.

The following examples are provided for the purpose of further illustrating the present invention but are in no way to be taken as limiting.

EXAMPLE 1

An autoclave was charged with 7 moles of naphthalene, 2.8 moles of phenol and 2.67 moles of hydrogen fluoride and as they were stirred gently, 0.7 moles of boron trifluoride was supplied. Subsequently, reaction was performed at a temperature of 100° C. for 4 h under stirring. After the reaction, the pressure in the autoclave was reduced to recover the catalyst and the low-boiling point components were removed with nitrogen that was blown into the autoclave at 180° C. at a rate of 3 L/min for 5 h. A polymer was produced in a yield of 58% and it had a softening point of 54° C. and a number average molecular weight of 350. It also had a phenolic hydroxyl equivalent of 486 g/eq and was soluble in chloroform.

EXAMPLE 2

An autoclave was charged with 4 moles of naphthalene, 6 moles of phenol, 3.5 moles of hydrogen fluoride and 1 mole of boron trifluoride. Subsequently, the temperature in the autoclave was raised to 120° C. and reaction was performed for 4 h under stirring. Thereafter, the catalysts were recovered and the low-boiling point components were removed by the same procedures as in Example 1. A polymer was produced in a yield of 60% and it had a softening point of 75° C., a number average molecular weight of 370 and a phenolic hydroxyl equivalent of 283 g/eq.

The product was subjected to a $^{13}$C-NMR spectroscopic analysis and the aromatic carbon and naphthenic carbon both derived from the naphthalene condensate were observed at 120–140 ppm and below 50 ppm as chemical shifts from the reference TMS (tetramethyl silane). In addition, the carbon directly bonded to the phenolic hydroxyl group and the carbon in the ortho position of phenol were clearly observed at near 155 ppm and 115 ppm, respectively. These results show that the product of Example 2 had an average structure in which phenolic hydroxyl groups were bonded to the naphthalene condensate and the active site for the curing reaction was preserved in the ortho position.

EXAMPLE 3

An autoclave was charged with 0.5 moles of naphthalene, 3.5 moles of phenol, 1.5 moles of hydrogen fluoride and 0.4 moles of boron trifluoride and reaction was performed at a temperature of 120° C. for 4 h under stirring. Subsequently, the catalysts were removed and the low-boiling point components were removed by the same procedures as in Example 1. A polymer was produced in a yield of 25.4% and it had a softening point of 67.4° C., a number average molecular weight of 350 and a phenolic hydroxyl equivalent of 205 g/eq.

EXAMPLE 4

An autoclave was charged with 4 moles of naphthalene, 0.1 mole of dicyclopentadiene, 6 moles of phenol, 3.5 moles of hydrogen fluoride and 1 mole of boron trifluoride. Subsequently, the temperature in the autoclave was raised to 120° C. and reaction was performed for 4 h under stirring. Thereafter, the catalysts were recovered and the low-boiling point components were removed by the same procedures as in Example 1.

A polymer was produced in a yield of 60% and it had a softening point of 70° C., a number average molecular weight of 370 and a phenolic hydroxyl equivalent of 340 g/eq.

The product was subjected to a $^{13}$C-NMR spectroscopic analysis and the aromatic carbon derived from the naphthalene condensate was observed at 120–140 ppm and the naphthalene-derived naphthenic carbon and the dicyclopentadiene-derived methylene carbon were observed at below 50 ppm as chemical shifts from the reference TMS (tetramethyl silane). In addition, the carbon directly bound to the phenolic hydroxyl group and the carbon in the ortho position of phenol were clearly observed at near 155 ppm and 115 ppm, respectively. These results show that the product of Example 4 had an average structure in which phenolic hydroxyl groups were bonded to the naphthalene and dicyclopentadiene condensates and the active site for the curing reaction was preserved in the ortho position.

Reference Example 1

Ten parts by weight of hexamethylene tetramine was added to each of the products of Examples 2 and 4 and the mixtures were heated to melt, whereupon gas evolution and viscosity increase started at about 120° C. A treatment at 180° C. for 12 h gave an infusible cured product. It can therefore be seen that the phenolic hydroxyl groups in the products of Examples 2 and 4 had a similar backbone reactivity to phenol, hence having a reactive phenolic structure as part of their molecular backbone.

Reference Example 2

In accordance with the method of producing an epoxy resin from bisphenol A and epichlorohydrin (see "A Handbook of Epoxy Resins", p. 23, Nikkan Kogyo Shinbunsha, 1987), each of the products of Examples 2 and 4 was reacted with epichlorohydrin, whereupon a glycidyl group was introduced to give a glycidylated product. The resulting glycidylated products were mixed with 12 parts of hexamethylenediamine (curing agent of epoxy resins) and heated at 120° C. Each mixture was verified to cure thermally. It can therefore be seen that hydroxyl groups in the products of Examples 2 and 4 had reactivity similar to the hydroxyl group in phenol, hence providing said products with a reactive phenolic structure as part of their molecular backbone.

Industrial Advantages

The phenol derivatives of the present invention have both a phenolic structure which contributes reactivity and a condensed polycyclic aromatic structure which contributes high resistance to heat and water. If unsaturated cyclic aliphatic hydrocarbons are also used as a reactant with phenols, the resulting phenol derivatives also have a cyclic aliphatic hydrocarbon structure which contributes not only water resistance but also tenacity. Hence, the phenol derivatives of the invention can serve as starting materials for the manufacture of thermosetting resins that are improved in resistance to heat and water and, optionally in tenacity; alternatively, they can be used as modifiers for imparting these desirable characteristics.

As another advantage, the phenol derivatives of the invention can easily be produced from naphthalene, dicyclopentadiene, phenol and other materials that are industrially available at low cost. If a mixture of HF and BF$_3$ is used as a Friedel-Crafts catalyst to produce the phenol derivatives, a great industrial advantage will result since not only high yield is achieved but also the catalyst components can be easily recovered and removed.

What is claimed is:

1. A phenol derivative having a phenolic structure as part of the molecular backbone, which is produced by reacting reactants consisting essentially of a condensed polycyclic aromatic hydrocarbon and a phenol in the presence of a mixture of hydrogen fluoride and boron trifluoride as a catalyst at a temperature of 0–350° C. wherein said phenol derivative has a softening point of no more than 150° C., a number average molecular weight of 250–800 and a phenolic hydroxyl equivalent of 140–850 g/eq, said condensed polycyclic aromatic hydrocarbon being selected from the group consisting of naphthalene, methylnaphthalene, anthracene, phenanthrene, pyrene, and mixtures thereof and wherein said phenol is selected from the group consisting of phenol, cresol, xylenol, α-naphthol and β-naphthol, said phenol being used in an amount of 1.5 to 20 moles per mole of said condensed polycyclic aromatic hydrocarbon.

2. A phenol derivative according to claim 1, wherein the condensed polycyclic aromatic hydrocarbon is naphthalene.

3. A phenol derivative according to claim 2, wherein the phenol is phenol.

4. A process for producing a phenol derivative comprising reacting reactants consisting essentially of a condensed polycyclic aromatic hydrocarbon and a phenol in the presence of a mixture of hydrogen fluoride and boron trifluoride as a catalyst at a temperature of 0–350° C., said condensed polycyclic aromatic hydrocarbon being selected from the group consisting of naphthalene, methylnaphthalene, anthracene, phenanthrene, pyrene, and mixtures thereof and wherein said phenol is selected from the group consisting of phenol, cresol, xylenol, α-naphthol and β-naphthol, said phenol being used in an amount of 1.5 to 20 moles per mole of said condensed polycyclic aromatic hydrocarbon, wherein said phenol derivative has a phenolic structure as part of the molecular backbone.

5. A process according to claim 4, wherein the catalyst is used in an amount ranging from 0.02 to 10 moles per mole of the condensed polycyclic aromatic hydrocarbon.

6. A process according to claim 4, wherein the hydrogen fluoride and the boron trifluoride are used in respective amounts of 0.1–10 moles and 0.05–5.0 moles per mole of the condensed polycyclic aromatic hydrocarbon.

7. A process according to claim 4, wherein the reaction temperature is in the range of 50 to 200° C.

8. A phenol derivative having a phenolic structure as part of the molecular backbone, which is produced by reacting reactants consisting essentially of a condensed polycyclic aromatic hydrocarbon and a phenol in the presence of a mixture of hydrogen fluoride and boron trifluoride as a catalyst at a temperature of 50–200° C. wherein said phenol derivative has a softening point of no more than 130° C., a number average molecular weight of 300–600 and a phenolic hydroxyl equivalent of 140–850 g/eq, said condensed polycyclic aromatic hydrocarbon being selected from the group consisting of naphthalene, methylnaphthalene, anthracene, phenanthrene, pyrene, and mixtures thereof and wherein said phenol is selected from the group consisting of phenol, cresol, xylenol, α-naphthol and β-naphthol, said phenol being used in an amount of 1.5 to 20 moles per mole of said condensed polycyclic aromatic hydrocarbon.

9. A process for producing a phenol derivative comprising reacting reactants consisting essentially of a condensed polycyclic aromatic hydrocarbon and a phenol in the presence of both hydrogen fluoride and boron trifluoride at a temperature of 50–200° C., said condensed polycyclic aromatic hydrocarbon being selected from the group consisting of naphthalene, methylnaphthalene, anthracene, phenanthrene, pyrene, and mixtures thereof and wherein said phenol is selected from the group consisting of phenol, cresol, xylenol, α-naphthol and βP-naphthol, said phenol being used in an amount of 1.5 to 20 moles per mole of said condensed polycyclic aromatic hydrocarbon, wherein said phenol derivative has a phenolic structure as part of the molecular backbone.

10. A phenol derivative having a phenolic structure as part of the molecular backbone, which is produced by reacting reactants consisting essentially of a condensed polycyclic aromatic hydrocarbon and a phenol in the presence of both hydrogen fluoride and boron trifluoride at a temperature of 0–200° C. wherein said phenol derivative has a softening point of no more than 150° C., a number average molecular weight of 250–800 and a phenolic hydroxyl equivalent of 140–850 g/eq, said condensed polycyclic aromatic hydrocarbon being selected from the group consisting of naphthalene, methylnaphthalene, anthracene, phenanthrene, pyrene, and mixtures thereof and wherein said phenol is selected from the group consisting of phenol, cresol, xylenol, α-naphthol and β-naphthol, said phenol being used in an amount of 1.5 to 20 moles per mole of said condensed polycyclic aromatic hydrocarbon.

11. A process for producing a phenol derivative comprising reacting reactants consisting essentially of a condensed polycyclic aromatic hydrocarbon and a phenol in the presence of both hydrogen fluoride and boron trifluoride at a temperature of 0–200° C., said condensed polycyclic aromatic hydrocarbon being selected from the group consisting of naphthalene, methylnaphthalene, anthracene, phenanthrene, pyrene, and mixtures thereof and wherein said phenol is selected from the group consisting of phenol, cresol, xylenol, α- and β-naphthol, said phenol being used in an amount of 1.5 to 20 moles per mole of said condensed polycyclic aromatic hydrocarbon, wherein said phenol derivative has a phenolic structure as part of the molecular backbone.

\* \* \* \* \*